United States Patent [19]

Saatchi et al.

[11] Patent Number: 5,122,316
[45] Date of Patent: Jun. 16, 1992

[54] ENHANCED FOAMING OF THERMOPLASTICS FOR IN-SITU FABRICATION OF ADVANCED ARTICLES

[75] Inventors: Hossein Saatchi; Patrick J. Murray, both of Rockford, Ill.; Robert E. Coleman, Provo, Utah; Kurt A. Smith, Rockford, Ill.

[73] Assignee: Sundstrand Corporation, Rockford, Ill.

[21] Appl. No.: 419,723

[22] Filed: Oct. 11, 1989

[51] Int. Cl.⁵ .............................. B29C 67/00
[52] U.S. Cl. ...................... 264/46.4; 264/51; 264/54; 521/85; 521/87; 521/92; 521/97; 521/113
[58] Field of Search .............. 521/85, 87, 97, 113, 521/92; 264/51, 54, 46.4, 126

[56] References Cited

U.S. PATENT DOCUMENTS

| | | | |
|---|---|---|---|
| 2,930,770 | 3/1960 | Wade | 260/2.5 |
| 2,930,771 | 3/1960 | Wade | 260/2.5 |
| 3,114,724 | 12/1963 | Hunter | 260/2.5 |
| 3,455,848 | 7/1969 | Yoncoskie | 260/2.5 |
| 3,484,391 | 12/1969 | Wheatley et al. | 260/2.5 |
| 3,574,146 | 12/1967 | Schnell et al. | 260/2.5 |
| 3,591,533 | 7/1971 | Schnell | 260/2.5 |
| 4,266,041 | 5/1981 | Kuhnel et al. | 521/92 |
| 4,383,048 | 5/1983 | Hall et al. | 521/85 |
| 4,394,458 | 7/1983 | Wade | 521/82 |
| 4,403,045 | 9/1983 | Wade | 521/82 |
| 4,413,065 | 11/1983 | Hall et al. | 521/82 |
| 4,433,069 | 2/1984 | Harper | 521/99 |
| 4,491,554 | 1/1985 | Hamel et al. | 264/141 |
| 4,507,406 | 3/1985 | Kucharska et al. | 521/85 |
| 4,550,124 | 10/1985 | Kucharska et al. | 521/85 |
| 4,596,835 | 6/1986 | Werner et al. | 521/122 |
| 4,615,850 | 10/1986 | Pecsok | 264/54 X |
| 4,769,397 | 9/1988 | Lapierre et al. | 521/85 |
| 4,814,530 | 3/1989 | Ward et al. | 264/331.12 X |
| 4,933,131 | 6/1990 | Okey et al. | 264/255 |

Primary Examiner—David A. Simmons
Assistant Examiner—J. Sells
Attorney, Agent, or Firm—Wood, Phillips Mason, Recktenwald & VanSanten

[57] ABSTRACT

Processes using high temperature thermoplastic polymers in the in-situ fabrication in the formation of foamed composite sandwich or foam articles often result in weak unsound products which may be avoided by utilizing a high temperature thermoplastic in powder form (22), a blowing agent having a high decomposition temperature (24), and, if desired, reinforcers and/or fillers, (28), mixing the thermoplastic, blowing agent and reinforcer and fillers (30), placing the mixture in a mold and, if forming a composite structure, in abutment with at least one skin (34), and applying sufficient heat and/or pressure to the mold and its contents to melt the thermoplastic and generate gas within said mixture by decomposition of the blowing agent (38). Also, an activator may be included with the blowing agent which promotes the production of gas (26). The thermoplastic should be free from any material which will react with the blowing agent or the activator at temperatures below the melting point of the thermoplastic.

21 Claims, 1 Drawing Sheet

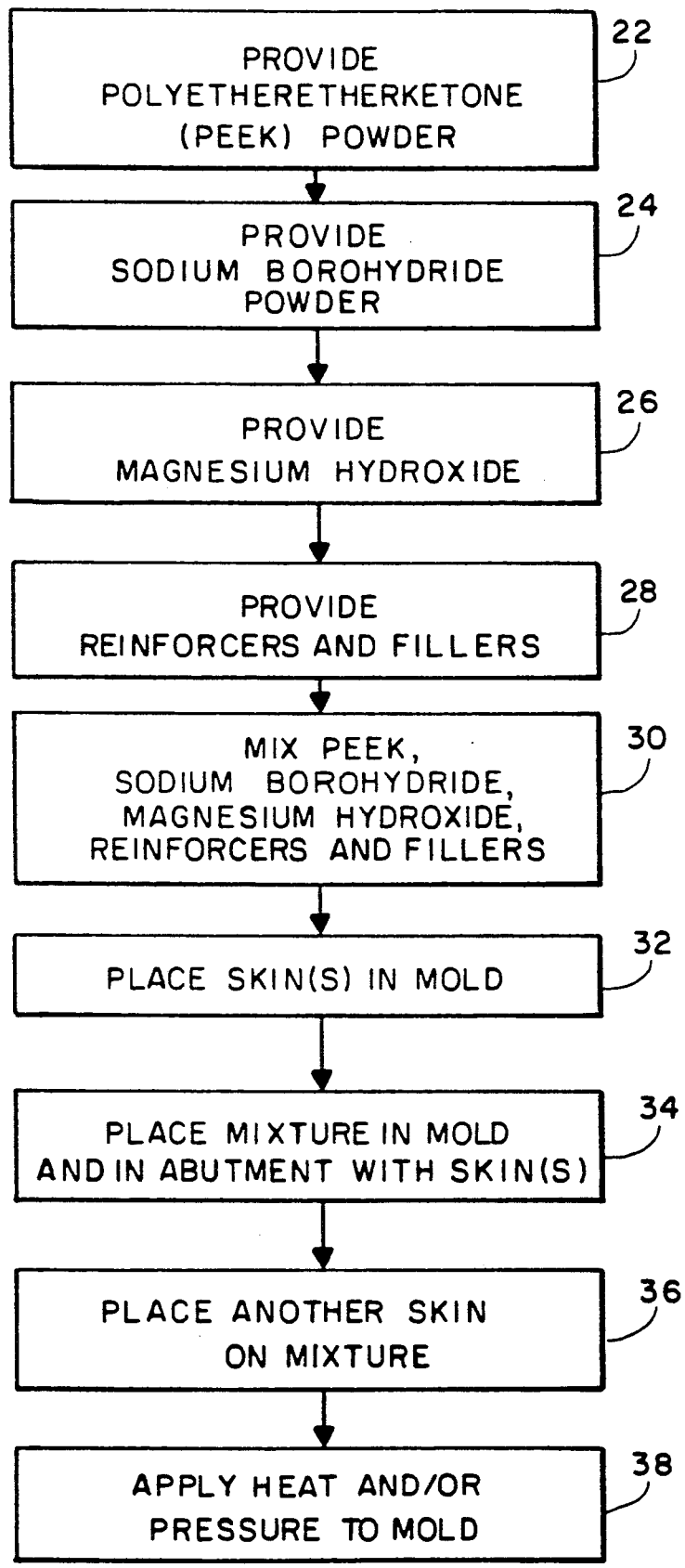

ENHANCED FOAMING OF THERMOPLASTICS FOR IN-SITU FABRICATION OF ADVANCED ARTICLES

FIELD OF THE INVENTION

This invention relates to an improved in-situ fabrication process for the foaming of thermoplastic articles.

BACKGROUND OF THE INVENTION

It is widely known to use blowing agents to foam, or produce a cellular structure within, thermoplastic materials. The goal in using a blowing agent is to make the thermoplastic article of lower density and lighter in weight. Such characteristics as lower weight enable the thermoplastic articles to be used more extensively in applications such as aircraft and space vehicles.

The method currently used to foam thermoplastics is to add to a thermoplastic a blowing agent and/or other materials which volatilize and generate gas which permeates the thermoplastic and forms an internal cellular structure within the thermoplastic article. Many of the blowing agents used are chemical blowing agents which react with the thermoplastic through thermal or chemical decomposition in order to generate the required gas.

High temperature thermoplastic engineering polymers are useful in modern applications because of their great temperature resistance, their ability to be reinforced with fibrous or nonfibrous materials, and their ability to be processed at reasonable temperatures.

In foaming high temperature engineering polymers conventional blowing agents volatilize at too low a temperature to be highly effective. Upon decomposition within a high temperature thermoplastic, the gas generated merely escapes the mixture and will not form the desired cellular structure because the thermoplastic will not have reached its melting temperature and cannot flow to form cells. Even when blowing agents which have decomposition temperatures about the melting point of high-temperature thermoplastics are used, other problems, such as lack of oxygen in a closed mold or insufficient gas production, are still present.

In in-situ fabrication of high-temperature thermoplastic advanced composites, high internal pressure is needed to consolidate the sandwich skin(s). Due to the high operating and molding pressures needed for production and due to the difference in thermal coefficients of expansion of the materials, cracks and voids may form in the structure if insufficient pressure is present. Failure to produce sufficient in-situ pressure to consolidate the article will also result in an inconsistent foaming action.

The present invention is directed to overcoming one or more of the above problems.

SUMMARY OF THE INVENTION

It is a principal object of the invention to provide a new and improved process for foaming high temperature thermoplastics and to consistently form sound structures in an in-situ fabrication process.

The principal object of the invention is achieved in a process which includes the step of providing a generally powder-like mixture including a blowing agent and a high temperature thermoplastic that is: free from materials which will react with the blowing agent at a temperature below about the melting point of the thermoplastic. The blowing agent is also chosen to be nonreactive with the thermoplastic at a temperature below that of the melting point of the thermoplastic and has a decomposition temperature near or above the thermoplastic's melt temperature. The mixture is then placed in a mold and thereafter sufficient heat and/or pressure is applied to the mold and its contents to melt the thermoplastic and decompose the blowing agent, thus producing the desired gas for foaming and internal pressure for consolidation.

An activator which will promote the production of gas may also be used. The activation, resulting from the activator itself reacting with the blowing agent or from the blowing agent reacting with the activator's decomposition products, takes place at a temperature near or above the thermoplastic's melting point. The activator solves the problem of incomplete decomposition of the blowing agent and also may provide fluid pressure for consolidation through its own decomposition. The enhanced pressure resulting from the activation results in more consistent, sound, foamed articles. When using skins in the process, better consolidation of the skins will also be attained due to the enhanced pressure created.

In highly preferred embodiments of the invention, sodium borohydride is used as the blowing agent, magnesium hydroxide is used as an activator, and also as a source of nucleating materials and polyetheretherketone is used as the thermoplastic.

Additives can be advantageously used to improve the properties of the thermoplastic article. Fillers and/or reinforcers made from materials such as, but not limited to, glass and carbon, and in the form of microballoons, fibers, spheres, whiskers, and other shapes, can be used to increase the stiffness or strength of the material.

Other objects and advantages will become apparent from the following specification and accompanying drawing.

DESCRIPTION OF THE DRAWINGS

The FIGURE is a block diagram indicating the use of the process of the invention for an in-situ fabrication of an advanced composite.

DESCRIPTION OF THE PREFERRED EMBODIMENT

This invention relates to the process for the foaming of monolithic or composite high-temperature thermoplastic structures suitable for use in environments where temperature resistant, light weight or low density, strong articles are required. Preferably the thermoplastic material used has a relatively high melting point, being in excess of 350° F. By way of example, suitable thermoplastics include polyetheretherketone (PEEK), polyetherimide (PEI), and polyetherketoneetherketoneketone (PEKEKK), although others may be used.

The structures will normally, include reinforcers and/or fillers. The reinforcers and fillers provide the resulting thermoplastic article with advantageous properties such as lower thermal expansion and added strength and stiffness.

The reduction in relative weight or density in the finished structure is obtained through use of a foaming agent. Importantly, the foaming agent will not appreciably generate gas required to foam until temperatures in excess of the melting point of the thermoplastic are reached. At temperatures on the order of 650° F. to 800° F., the blowing agent sodium borohydride, for example, will begin to decompose, generating molecular hydrogen gas and foaming a molten high temperature thermoplastic such as PEEK. Sodium borohydride is used as a physical blowing agent where it will not appreciably react chemically with the thermoplastic or materials contained in the thermoplastic at temperatures below the melting point of the thermoplastic. As an example, if the thermoplastics or materials used are not dry, the water contained in the materials can react with the sodium borohydride before the melting point temperature of the thermoplastic is reached and decrease the amount of foaming. Consequently, the thermoplastic should not react with the blowing agent at temperatures below the melting point of the former. Similarly, materials used other than the thermoplastic should not react with the blowing agent unless at temperatures near or above the melting point of the thermoplastic.

Turning now to the drawing, the FIGURE illustrates the exemplary embodiment of the invention, an in-situ fabrication of a foamed high-temperature thermoplastic composite. The process may also be used for the production of polymeric articles of monolithic construction simply by eliminating the steps involving the manipulation or use of skins.

In the block diagram the first step or block 22 is to provide a thermoplastic powder, preferably polyetheretherketone powder (PEEK). PEEK has a melting point temperature in excess of 650° F. and has desirable characteristics including resistance to high temperatures and the ability to be reinforced with fibrous and nonfibrous additives.

A preferred blowing agent such as sodium borohydride in powder form is provided as step 24. Sodium borohydride is a favorable blowing agent in the production of such foams and can be used as a fine powder, which aids in handling and processing. Sodium borohydride is used as a physical blowing agent in that it will not react with the thermoplastic or any materials contained therein below the thermoplastic's melt temperature and in any case decomposes and generates gas without the requirement of a chemical reaction involving the thermoplastic.

Equation 1 illustrates the decomposition of sodium borohydride when no activator is used.

$$O_2 + NaBH_4 \rightarrow 2H_2 + NaBO_2 \qquad (1)$$

The oxygen for the reaction is provided by the surrounding environment. Of course in a closed mold the oxygen can become scarce and the foaming action can be inhibited. Without sufficient oxygen the article x-ay not foam uniformly.

The desired density of the finished product can be calculated on the basis of gas laws and the rule of mixtures and can be accurately predicted on the basis of starting composition. For example, in a mixture with no activator, 0.02 grams of sodium borohydride can be mixed with 100 grams of thermoplastic for a slight reduction in density. On the other hand 0.10 grams can be added for a greater density reduction on the order of 50%.

In an inert environment which lacks appreciable amounts of oxygen, sodium borohydride will start to thermally decompose around 975° F. This temperature is above the processing temperature range of presently available high temperature thermoplastics. However, this phenomenon may be used for foaming materials with melting point temperatures above 1,000° F., such as aluminum, magnesium, or next generations of high temperature organic materials.

Step 26 is to provide an activator for the blowing agent such as magnesium hydroxide. This step is optional but often is highly desirable when insufficient oxygen is present as is the case especially when forming large parts. Magnesium hydroxide has a decomposition temperature in excess of 650° F. The improvement in using magnesium hydroxide is that it will promote the generation of hydrogen gas for foaming by decomposing into magnesium oxide, which acts as nucleating material, and water, which acts as an activator. The water reacts with the sodium borohydride to produce hydrogen gas. By such promotion, more hydrogen gas will be generated producing more pressure, thus resulting in consistently sound articles. The problem of lack of oxygen in a closed mold, as previously referred to, is also avoided.

The following two equations illustrate the reactions involved:

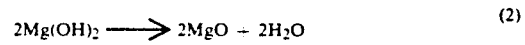

$$2Mg(OH)_2 \longrightarrow 2MgO + 2H_2O \qquad (2)$$

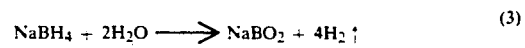

$$NaBH_4 + 2H_2O \longrightarrow NaBO_2 + 4H_2 \uparrow \qquad (3)$$

$$NaBH_4 + 2Mg(OH)_2 \longrightarrow 2MgO + NaBO_2 + 4H_2 \uparrow \qquad (4)$$

Equation (2) illustrates the decomposition of magnesium hydroxide into magnesium oxide and water. In equation (3) the sodium borohydride reacts with water to form hydrogen gas. Equation (4) represents the overall reaction process. Two moles of water react with one mole of sodium borohydride to produce four moles of hydrogen gas and for every one gram of sodium borohydride used, 2.37 liters of gas result. In this reaction the sodium borohydride to magnesium hydroxide ratio is preferably 1:3 by weight.

The next step, shown at 28, is to provide reinforcers and/or fillers. This step is not required but additives can be used to improve the properties of the thermoplastic articles. A variety of fibers, balloons, spheres, whiskers and other shapes can be used to increase the stiffness or strengthen the material. Such materials include carbon fibers and microspheres, glass fibers and microballoons, SIC whiskers, calcium carbonate, wollastonite and other fillers.

Carbon fiber and/or glass or carbon microspheres are conventionally used as reinforcers and fillers. When carbon fiber is used, as an example, the material may be obtained as commingled or unidirectional fabric, carbon/PEEK hybrid fabric, and carbon/PEEK unidirectional tape. Glass microspheres with a diameter of 5.8 mils. having densities of 0.0216 lbs./in.$^3$ and 0.016 lbs./in.$^3$, and carbon hollow microspheres, either Type E having an average diameter of 0.82 mils. and a density of 0.0134 lb./in.$^3$ or Type L having an average diameter of 1.96 mils and a density of 0.0055 lb./in.$^3$, (both types manufactured by Versar Mfg. Inc.), have been employed with success. The glass and carbon microspheres have isostatic crushing strengths of 10, 4, 8, and 2.5 ksi respectively.

The polyetheretherketone, sodium borohydride, magnesium hydroxide, reinforcers and fillers are then mixed 30.

Step 32 is to place one or more skins in a mold. The term skin includes mats, braids, and woven fabrics. The skins may be pre-impregnated or commingled. This step is optional, being used only when composite sandwich structures are to be formed. When foam articles are to be made, this step 32 is omitted entirely.

Placing the mixture of the thermoplastic, sodium borohydride, magnesium hydroxide, and reinforcers and/or fillers in the mold and in abutment with the skin, if used, is the next step, shown at 34.

Step 36 is also optional and is to place another skin on the mixture. The two skins used will form the outer covering of the composite sandwich article produced. For foam article production, this step is omitted.

Sufficient heat and/or pressure is then applied, step 38, to the mold and its contents to consolidate the mixture. The thermoplastic will melt and hydrogen gas will be generated by the decomposition of the magnesium hydroxide and sodium borohydride and by the subsequent reaction as illustrated in equation (4).

An optional step preceding the consolidation of the mixture is to cold compact the mixture to obtain a net-shape configuration. The mixture may also include skins, reinforcers, and/or fillers when cold compacted. The cold compaction takes place at substantially standard temperatures and when using PEEK, PEI, or PEKEKK pressures up to 5 ksi are used.

It should be further noted that the invention provides strong structures without the breakage of reinforcement such as glass microspheres or fibers that typically occurs with injection molding.

We claim:

1. A process for the in-situ fabrication of advanced, foamed thermoplastic composites comprising the steps of:
   (a) providing powdered magnesium hydroxide;
   (b) providing powdered sodium borohydride;
   (c) providing a powdered high-temperature thermoplastic which will not react with the sodium borohydride at a temperature below that of the melting point of the thermoplastic;
   (d) providing reinforcers and/or fillers;
   (e) mixing the magnesium hydroxide, sodium borohydride, thermoplastic and reinforcers and/or fillers to produce a mixture;
   (f) placing the mixture in a mold and in abutment with at least one skin; and
   (g) applying sufficient heat and or pressure to the mold and its contents to melt the thermoplastic and generate gas within said mixture by thermal decomposition of the magnesium hydroxide and sodium borohydride and by the subsequent reaction of the decomposition product of the magnesium hydroxide with the sodium borohydride.

2. The process as recited in claim 1 wherein the step of providing is performed using the thermoplastic polyetheretherketone.

3. The process as recited in claim 1 wherein the step of providing is performed using glass microspheres as reinforcers.

4. The process as recited in claim 1 wherein the step of placing is performed using a woven fabric as a skin.

5. The process as recited in claim 1 wherein the step of applying is preceded by the step of cold compacting the mixture, with or without skins, under sufficient pressure to obtain a net shape fabrication.

6. A process for the production of foamed, high-temperature thermoplastic articles utilizing sodium borohydride and an activator comprising the steps of:
   (a) providing a powdered high-temperature thermoplastic free from materials that will react with sodium borohydride at a temperature less than that of the melting point of the thermoplastic;
   (b) providing powdered sodium borohydride;
   (c) providing a powdered activator that will cause activation of the sodium borohydride at a temperature near or above the melting point of the thermoplastics;
   (d) mixing the thermoplastic, sodium borohydride and activator to produce a mixture;
   (e) placing the mixture in a mold; and
   (f) applying sufficient heat and/or pressure to the mold and its contents to consolidate the mixture and to generate gas within said mixture by thermal decomposition of the sodium borohydride and the activator and by the reaction of the decomposition product(s) of the activator with the sodium borohydride.

7. The process as recited in claim 6 wherein the step of providing is performed using an activator which will also provide nucleating materials.

8. The process as recited in claim 7 wherein the activator is magnesium hydroxide.

9. The process as recited in claim 6 wherein the step of providing is performed by including reinforcers and/or fillers.

10. The process as recited in claim 6 wherein the step of providing is performed by placing the mixture in abutment with at least one skin.

11. The process as recited in claim 6 wherein the step of applying is preceded by the step of cold compacting the mixture, with or without skins, reinforcers, or fillers, to obtain a partial shape fabrication.

12. A process for the production of foamed thermoplastic articles utilizing a blowing agent comprising the steps of:
   (a) providing a powdered high-temperature thermoplastic that is free from materials that will react with the blowing agent at a temperature below about the melting point of the thermoplastic;
   (b) providing a powdered blowing agent that does not react with the thermoplastic at a temperature below that of the melting point of the thermoplastic and having a decomposition temperature near the melting point temperature of the thermoplastic;
   (c) mixing the thermoplastic and blowing agent to produce a mixture;
   (d) placing the mixture in a mold; and
   (e) applying sufficient heat and/or pressure to the mold and its contents to melt the thermoplastic and decompose the blowing agent.

13. The process as recited in claim 12 wherein the step of providing includes using an activator which will cause activation of the blowing agent only at a temperature near or above the thermoplastic's melting point.

14. The process as recited in claim 12 wherein the step of providing includes using magnesium hydroxide as an activator for the blowing agent and provider of nucleating materials.

15. The process as recited in claim 12 wherein the step of providing is performed by including reinforcers and/or fillers.

16. The process as recited in claim 12 wherein the step of applying is preceded by the step of cold compacting the mixture, with or without additives, to form a partial shape fabrication.

17. The process as recited in claim 12 wherein the step of providing is performed using sodium borohydride as the blowing agent.

18. The process as recited in claim 17 wherein the step of providing is performed by including magnesium hydroxide as an activator for the sodium borohydride.

19. The process as recited in claim 18 wherein the step of providing is performed by including reinforcers and/or fillers.

20. The process as recited in claim 19 wherein the step of providing is performed by using polyetheretherketone as the thermoplastic.

21. The process as recited in claim 20 wherein the step of placing is performed using at least one skin which is placed in the mold.

* * * * *